United States Patent [19]
Newbill

[11] Patent Number: 5,927,619
[45] Date of Patent: Jul. 27, 1999

[54] LOCK ASSEMBLY FOR WHEEL SUPPORTED IRRIGATION SYSTEM

[76] Inventor: Anthony J. Newbill, P.O. Box 27, Madras, Oreg. 97741

[21] Appl. No.: 09/005,496

[22] Filed: Jan. 12, 1998

[51] Int. Cl.6 .................................................... B05B 3/18
[52] U.S. Cl. .......................... 239/726; 239/723; 239/741; 188/6
[58] Field of Search .................................... 239/723, 726, 239/728, 741; 188/6

[56] References Cited

U.S. PATENT DOCUMENTS

| | | | |
|---|---|---|---|
| 3,071,327 | 1/1963 | Cornelius | 239/741 X |
| 3,618,859 | 11/1971 | Watts | 239/726 X |
| 3,726,366 | 4/1973 | Williams | 239/726 X |

*Primary Examiner*—Andres Kashnikow
*Assistant Examiner*—David Deal
*Attorney, Agent, or Firm*—James D. Givnan, Jr.

[57] ABSTRACT

A wheel supported irrigation system is provided with a locking assembly to immobilize the system against travel resulting from high winds or other causes. A system water pipe carries positionable leg members which, when deployed, are in ground contact. Wheel engaging arms carried by each leg member are adapted for engagement with wheel segments to stabilize the associated leg member when operatively deployed. The leg members include extensions to facilitate ground contact. The system water pipe is provided with leg engageable retainers to allow stowage of the leg members when retracted and stowed lengthwise along the water pipe. The retainers are of I cross-section with flanges confining the retracted leg members in place.

6 Claims, 1 Drawing Sheet

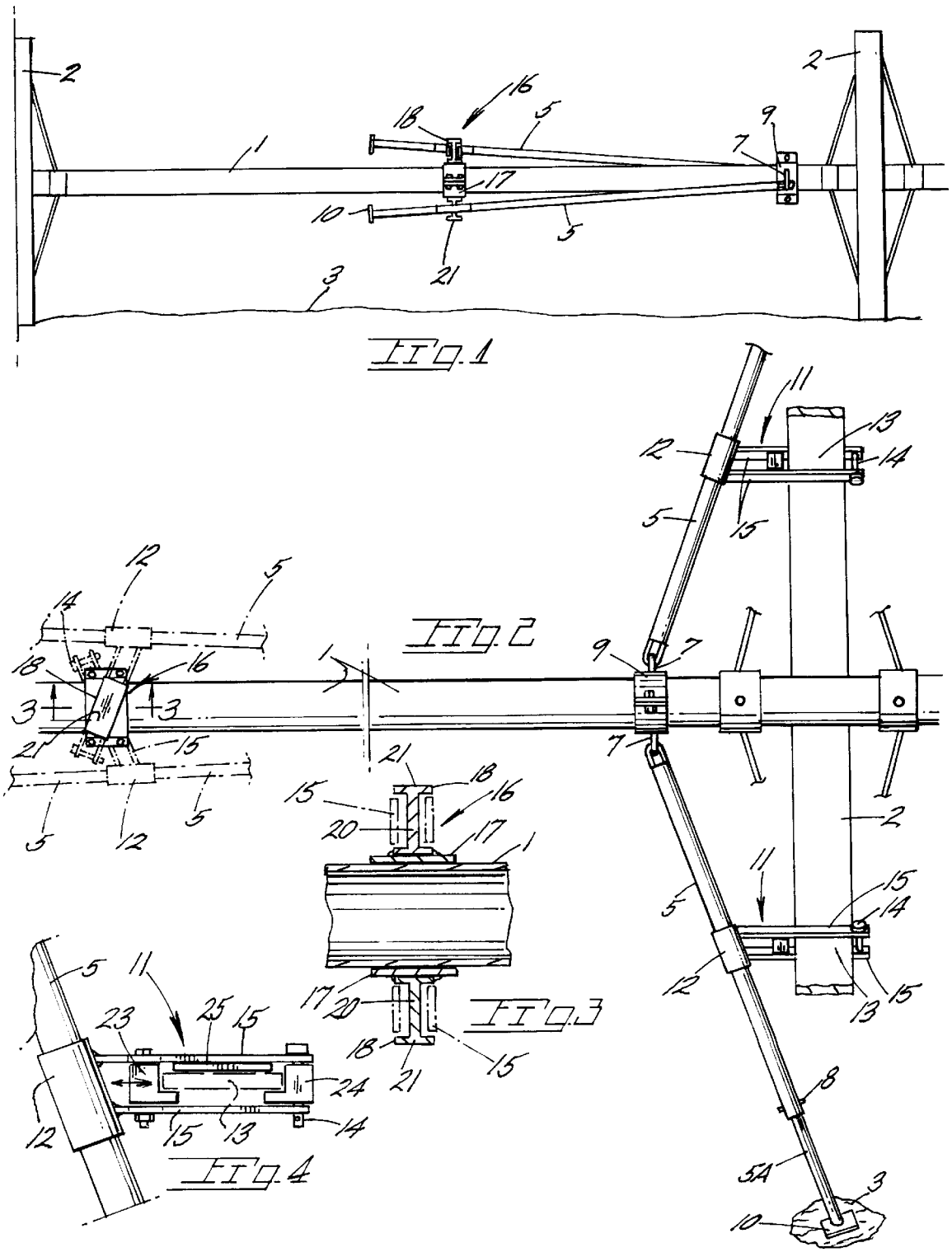

LOCK ASSEMBLY FOR WHEEL SUPPORTED IRRIGATION SYSTEM

BACKGROUND OF THE INVENTION

The present invention pertains generally to farm or field irrigation systems including a length of pipe supported at intervals by wheels for travel about a field.

In large agricultural enterprises it is common practice to irrigate using an irrigation system which is wheel supported and includes conduits with sprinklers located therealong to simultaneously water several acres. Such irrigation systems, being wheel supported, have a drawback in that there is some tendency for wheel supported pipe, termed in the trade a wheel line, to shift or move across the ground such as when subjected to heavy winds. Such displacement of the irrigation system is of course undesirable in that the desired amount of water for a particular crop has not been provided to the crop.

SUMMARY OF THE PRESENT INVENTION

The present invention is embodied within an irrigation system including a series of wheels and an axially disposed water conduit with provision made for locking the system in place during watering of a field.

The present lock assembly for an irrigation system includes a leg member swingably mounted at its proximal end on the pipe of a field irrigation system. A leg retainer supports the leg in a retracted position alongside the pipe during travel of the system over a field. When deployed the leg is in ground contact at its distal end. In place on each leg are wheel engaging means resulting in each leg also being supported by a wheel of the irrigation system. Accordingly, the present lock assembly is disposed for ready deployment to maintain an irrigation system stationary while permitting stowing of the assembly on the system water pipe during travel about a field.

Important objectives of the present lock assembly is the immobilizing of an irrigation system against undesired travel and which may be readily retracted into place alongside the irrigation system pipe permitting travel of the irrigation system through a field; the provision of a lock assembly which may utilize a pair of leg members oppositely disposed from the pipe of an irrigation system with each leg member in ground contact to prevent lateral movement of the pipe in either direction with the leg members being subsequently stowable alongside the water pipe; the provision of a lock assembly carried by the water pipe of an irrigation system and having a leg member adapted for engagement with a wheel of the irrigation system to inhibit wheel rotation; the provision of a lock assembly for attachment to the water pipe of an irrigation system which may be retracted and stowed thereon without hindering system operation; the provision of a lock assembly for immobilizing a wheel supported irrigation system adaptable to a wide range of makes and models of such systems.

BRIEF DESCRIPTION OF THE DRAWINGS

In the drawings:

FIG. 1 is a front elevational view of a section of an irrigation system fitted with the present lock assembly;

FIG. 2 is an enlarged plan view of the lock assembly of FIG. 1 with leg members of the assembly operatively deployed into ground contact;

FIG. 3 is a vertical sectional view taken along line 3—3 of FIG. 2; and

FIG. 4 is a plan view of wheel engaging means with spacer components.

DETAILED DESCRIPTION OF THE PREFERRED EMBODIMENTS

With continuing attention to the drawings wherein applied reference numerals indicate parts similarly hereinafter identified, the reference numeral 1 indicates a water carrying pipe of a field irrigation system supported in a concentric manner by wheels 2 for travel over a ground or field surface 3. Typically, water pipe 1 receives a pressurized flow of water for discharge from sprinklers (not shown) spaced along pipe 1. Such irrigation systems are well known in the farming trade and may move over a field or positioned at locations thereabout.

With regard to the present lock assembly, a leg member at 5 is pivotally mounted to a pipe attached fitting or clamp. One such suitable fitting includes rings 7 welded in place and permits displacement of the leg member in swingable fashion. Clamp halves are at 9.

The leg members 5 are preferably of an adjustable nature, as for example, provided with a telescoping end segment 5A lockable in place at a selected extended position by a pin 8. A foot 10 engages ground surface 3.

Located along each leg member 5 are wheel engaging means generally at 11 which may be positioned manually along the leg member for engagement with a rim segment 13 of wheel 2. Wheel diameters may range with different makes and models of irrigation systems, and accordingly wheel engaging means 11 includes a sleeve 12 positionable lengthwise of the leg member. Wheel engageable means 11 may be of bifurcated shape with parallel arm members at 15 defining an open area to admit wheel rim segment 13 and thereafter receiving a pin 14 to lock the segment in place. Arm members 15 are inclined relative the major axis of sleeve 12.

Leg retention means are indicated generally at 16 secured in place on pipe 1 and include semicircular clamp components 17 secured in place, as by fasteners, about the pipe wall. Secured in place on each clamp 17 is a retainer 18 which preferably is of I cross-section with the web 20 thereof adapted to receive bifurcated wheel engaging means 11 with flange components 21 of retainer 18 confining wheel engageable means 11 and the leg member 5 associated therewith against lateral displacement and in a retracted or stowed position in place along pipe 1 per FIG. 1.

Pin 14 is again utilized when the leg member 5 is retracted to confine the leg member on retainer 18. Accordingly, during movement of the irrigation system with rotation of pipe 1, the leg members are secured in juxtaposition with pipe member 1.

In use, the legs 5 are preferably utilized in pairs and upon removal of pins 14 one or both legs are swung outwardly from pipe 1 about rings or eyes 7. Wheel engaging means 11 is positioned along each leg 5 so as to permit placement of arms 15 thereof oppositely from a wheel segment 13 followed by reinsertion of locking pin 14. Telescopic end segment 5A of the leg is extended and locked in place in ground contact per FIG. 2. The proximal end of leg member 5 accordingly abuts pipe mounted clamp 9 to prevent lateral displacement of same. Retraction of leg member 5 is accomplished by reversal of the deployment procedure.

In FIG. 4, wheel engaging means 11 is shown including spacer elements 23, 24 and 25, prefereably non-metallic and of a synthetic high density materal to more closely confine rim segment 13 against excessive clearance and resulting rattle.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. In an irrigation system having a water pipe elevated from a ground surface by a series of wheels spaced along the pipe and concentric therewith, the invention comprising, a leg member, leg retention means on said water pipe to receive said leg member, pivot means on said pipe and coupling the proximal end of the leg member to the pipe, and wheel engageable means on said leg member, said leg member including a distal end offset from said wheel engageable means and one of said wheels for contact with a ground surface to prevent later displacement of said water pipe in at least one direction.

2. The invention claimed in claim 1 wherein said wheel engageable means includes a sleeve slidably mounted on said leg member.

3. The invention claimed in claim 2 wherein said wheel engageable means additionally includes an arm member engageable with a segment of one of the irrigation system wheels.

4. The invention claimed in claim 2 wherein said wheel engageable means includes arm members inclined relative the lengthwise axis of said sleeve.

5. The invention claimed in claim 1 wherein said leg retention means in place on the water pipe includes a retainer, said wheel engageable means additionally engageable with said retainer.

6. The invention claimed in claim 1 wherein said leg retention means includes a retainer of I cross-section and having a flange, said wheel engageable means including a sleeve slidably carried by said leg member, parallel arm members on said sleeve, said flange confining said arm members and the leg member associated therewith against lateral movement away from the water pipe.

* * * * *

UNITED STATES PATENT AND TRADEMARK OFFICE
CERTIFICATE OF CORRECTION

PATENT NO. : 5,927,619
DATED : Jul. 27, 1999
INVENTOR(S) : NEWBILL

It is certified that error appears in the above-indentified patent and that said Letters Patent is hereby corrected as shown below:

Column 1, line 18-19, delete "provided to the crop" and insert —distributed and that a wind propelled wheel line can damage crops, fences and other equipment--.

Column 2, line 14, change "may move" to --travel--

Column 2, line 14, after "field" insert --during operation--

Column 2, line 17, after "clamp" insert --9--

Column 2, line 20, delete "at 9" and insert --bolted in place--

Column 2, line 53, after "of" insert --a pin or--.

Signed and Sealed this

Second Day of November, 1999

*Attest:*

Q. TODD DICKINSON

*Attesting Officer*     *Acting Commissioner of Patents and Trademarks*